United States Patent [19]

Hiddink

[11] 4,095,162
[45] June 13, 1978

[54] CAPACITY CHANGER

[76] Inventor: Joseph Herman Arnold Peter Hiddink, 147 Burcher Road, Ajax, Ontario, Canada, L1S 2R6

[21] Appl. No.: 627,899

[22] Filed: Nov. 3, 1975

[51] Int. Cl.² .......................... H02M 9/04; H01G 7/00
[52] U.S. Cl. .................................. 320/1; 307/110; 361/120; 363/29
[58] Field of Search .......................... 321/15; 317/244; 307/110; 320/1

[56] References Cited

U.S. PATENT DOCUMENTS

| | | | |
|---|---|---|---|
| 3,562,629 | 2/1971 | Troubetzkoi | 317/244 |
| 3,652,914 | 3/1972 | Krausser | 320/1 |

*Primary Examiner*—Stuart N. Hecker
*Attorney, Agent, or Firm*—Robert D. Farkas

[57] ABSTRACT

A capacity changer device in which there is a first capacitor means of the 1-terminal capacitor type, and an enclosing hollow metal sphere enclosing the first capacitor means which may be spaced therefrom and being itself a 1-terminal capacitor with a current power supply for energizing a number of evacuated glass tubes containing an ionizable gas and forming part of the first capacitor means. It includes a second power suppy for direct current for charging the first capacitor means and connected also to the metal sphere for combining the charge to form a combination with the sphere of a change to a 2-terminal capacitor.

9 Claims, 8 Drawing Figures

CAPACITY CHANGER

This invention relates to improvements in capacity changers, and particularly, the change in capacity occurring when a small-value 1-terminal capacitor is changed into a substantial value 2-terminal capacitor, or vice versa.

SUMMARY OF THE INVENTION

An object of the present invention is to provide a capacity changer and its construction whereby there is achieved a change in capacity occurring in changing a small-value 1-terminal capacitor into a substantial value 2-terminal capacitor, and vice versa.

Another object of the invention is to provide the means for producing high potentials which can be positive or negative in nature and which are adapted for use in the study of nuclear structure and nuclear reactions.

Still a further object of the invention is to provide a novel and improved means for constuction and operation of a high power particle generator.

Another object of the invention is to provide a novel and improved device for generating potentials of either positive or negative nature of such magnitudes so as to attract, bend or repulse radiation.

Still another object of the invention is to provide novel and improved construction of a device for generation of potentials of either positive or negative nature, to attract or repulse mass.

A further object of the present invention is to provide novel and improved means and its construction for making an inexpensive, yet effective Intense Neutron Generator with possibility for slow to fast neutrom emission.

Still a further object of the present invention is to provide a novel and improved construction of a high power Radio Frequency Transmitter.

Another object of the present invention is to provide the means to generate strong electrical field which can be used to counteract other electrical fields or in conjunction with suitable electronic circuitry to detect interruption of said fields by the infiltration of foreign metal bodies, ore bodies, etc. These fields can be extended to several miles and are not affected by hot and cold layers of water.

Still another object of the present invention is to provide a novel and improved means which makes the generation of super high potentials possible, without having to resort to insulators that would be prohibitive in size or cost.

BRIEF DESCRIPTION OF THE DRAWINGS

The above and other objects, features and advantages of the present invention will become apparent from the following description of the drawings, wherein.

BACKGROUND OF THE INVENTION

In the past, the changing of 2-terminal capacitors to 1-terminal capacitors have been regarded largely as theoretical problems and devices. As for generators of high potentials, (in excess of 10 MeV), positive, negative or alternating in nature, they have been seen to be costly, cumersom and to need a fair amount of insulation.

The present invention seeks to provide means and construction for attaining the foreging objects at relatively low cost and with good expectation of rewarding results.

DETAILED DESCRIPTION OF THE PREFERRED EMBODIMENT

In order to understand clearly the nature of the present invention, and the best means for carrying it out, reference may be had to be the drawings in which like numerals denote similar parts throughout the several views.

Figure 1:
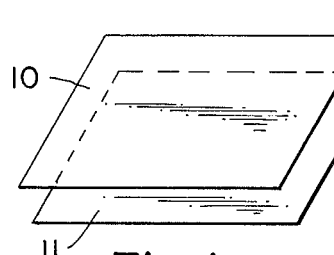
FIG 1 shows a simple capacitor consisting of two conducting plates which are separated by a dielectric.

FIG. 1 shows a simple capacitor consisting of two conducting plates 10 and 11 which are separated by a dielectric medium 12 which may be air or other insulating medium. On the other hand, there is shown in FIG. 2 a 1-terminal capacitor 13 which consists of only the single flat conducting plate 13.

Figure 3:
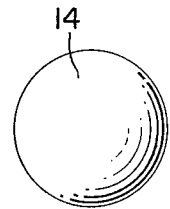
FIG. 3 depicts a 1-terminal capacitor consisting of a conducting sphere.

As shown in FIG. 3, there is depicted another type of 1-terminal capacitor 14 consisting solely of a hollow sphere 14.

Figure 2:
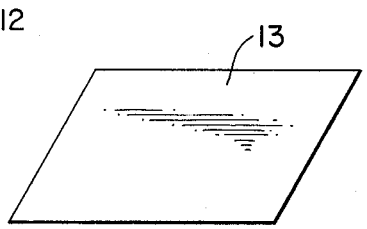
FIG. 2 depicts a 1-terminal capacitor consisting of a single conducting plate.

Formulae for the calculation of the capacitance of various shapes of 2-terminal capacitors and of various shapes of 1-terminal capacitors as shown in FIGS. 1, 2 and 3 are well known and given in various textbooks on electricity. The following shows how such elemental knowledge of capacitors is applied in development of the present invention in a novel form and construction.

Figure 4A:
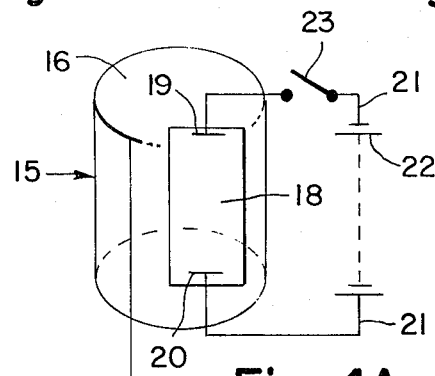
FIG. 4A is a schematic circuit diagram showing the capacity changing circuit arrangement consisting of a 1-terminal capacitor and including a non-conducting gaseous discharge tube.

In FIG. 4A, the schematic circuit diagram shows the capacity changing circuit consisting of a 1-terminal capacitor 15 consisting of a plate 16 which may be cylindrical in shape, and encloses or goes around a non-conducting gaseous discharge tube 18 made of sealed glass or the like material, with electrodes 19 and 20 inside the tube, and which is connected via lead wires 21 to a battery 22 through a switch 23.

Figure 4B:
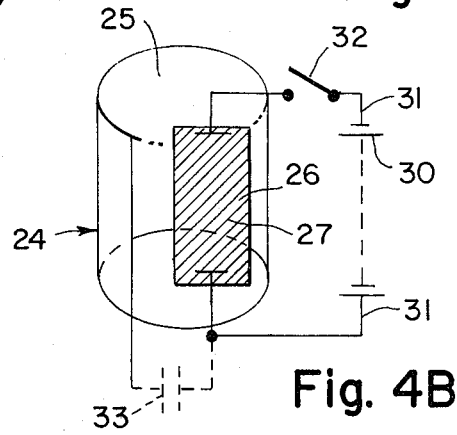
FIG. 4B is a schematic circuit diagram somewhat similar to FIG. 4A showing the realization of a 2-terminal capacitor including a gaseous discharge tube which is conducting, and in which the ionized gas acts as the second "plate"

In FIG. 4B, the schematic circuit diagram shows the realization of a 2-terminal capacitor 24 consisting of a plate 25 which may be cylindrical in shape which goes around a gaseous discharge tube 26 which is conducting. The ionized gas 27 within the tube 26 acts as the second plate under the influence of the voltagee from battery 30 delivered via lead wires 31 through the switch 32. The capacitance is indicated by the broken lines 33.

Figure 5:
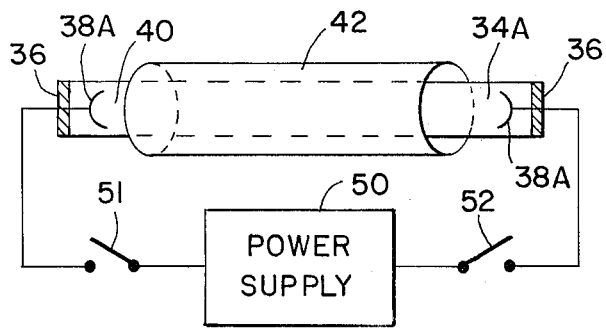
FIG. 5 shows a schematic circuit diagram of a device drawn as a glow-discharge device using a power supply.
Figure 6:
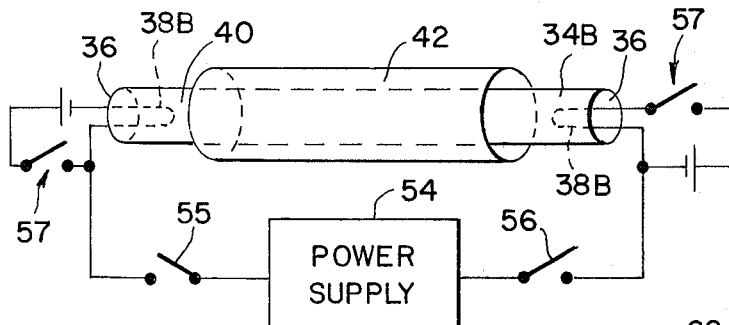
FIG. 6 is a schematic circuit diagram similar to FIG. 5 but showing a filament type version.
Figure 7:
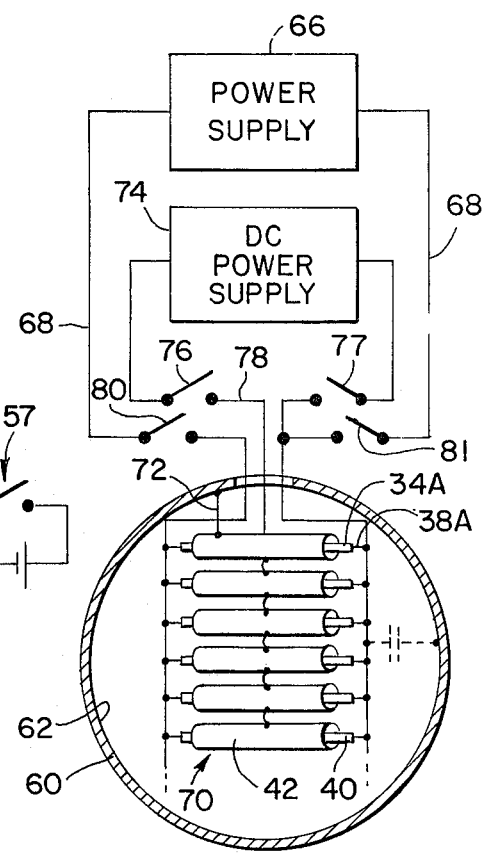
FIG. 7 is an elevational and schematic view of a composite arrangement including several of the tubes shown in FIGS. 5 and 6 mounted inside a hollow metal sphere, with related power supply sources.

As seen in FIGS. 5, 6 and 7, the basic capacitor of the present invention consists of one or more hollow tubes 34, 34A or 34B, which may be round, cylindrical or any other shape and made of non-conducting material such as glass. All of the tubes have end walls 36 at each end thereof and electrode terminals 38A or 38B are inserted through the sealed glass ends. The tubes are evacuated of air and filled with an ionizable gas 40 such as neon or argon, under suitable pressure. The tubes are partly covered with a conducting substance or coating 42, leaving the electrode terminals 38A and 38B free and insulated from the substance 42. The outside surface of each of the tubes 34, 34A and 34B are now for our purposes substance 42, which is a 1-terminal capacitor.

I have found that is is commercially advantageous to use a tube which does not have a phosphor coating, but which is otherwise similar to those used in the lighting industry. This type of tube, shown in FIG. 6, has heated filament-like terminals which make it possible to construct a high speed or fast-firing glow discharge circuit with a lower firing potential.

Thus, FIG. 5 shows the tube 34A drawn as a glow discharge device, using power supply 50, switches 51 and 52 and electrode terminals 38A. FIG. 6 shows the similar arrangement but with tube 34B connected to the power supply 54, including switches 55 and 56 and starters 57 at each end as is known in fluorescent lamp art.

Looking at FIG. 7, there is shown a hollow metal sphere 60 with a spherical chamber 62, with a number of tubes like those shown at 34A and 42 in FIG. 5 or at 34B and 42 in FIG. 6 inside the chamber 62. The sphere 60 acts also as a 1-terminal capacitor, having its own capacity (C equals 0.556 $d$) and C is the capacity of pF, and $d$ is the diameter of the conducting sphere in centimeters. Even if each tube 34 has its conducting surface 42 connected to sphere 60, the capacity of the sphere remains the same, namely (C equals 0.556$d$).

If the gas 40 inside the tubes 34A or 34B is ionized by an ac or dc power supply 66 through wires 68 and the switches shown in FIG. 7, and electrode terminals 38A and 38B as seen in FIGS. 5 and 6, a 2-terminal capacitor is formed herein called capacitor 70. Ionized gas 40 in each tube forms one plate and the conducting surface 42 forms the second plate. The glass tubes 34A or 34B are the dielectric.

This 2-terminal capacitor 70 can be of substantial value, depending on the size, shape or number of tubes 34–42 used inside the sphere. It will be noted that, although the capacitor 70 can have a substantial value, the capacity value of the enveloping sphere 60 remains the same.

Instead of mounting the tubes 34A or 34B in a sphere, they can be mounted in any other type of container with a conducting surface connected to the coating substance 42 by a wire 72 as shown in FIG. 7. However, for some purposes described herein, a sphere is the most efficient form.

The 2-terminal capacitor array 70 can be charged by a direct current power supply 74, via switches 76 and 77 and conductors connected to the electrodes 38A or 38B on the ends of the tubes 34 on one side, and another conductor 78 going to the conducting coating substance 42 on each tube. Whether ionized gas 40 forming one plate of the capacitor or conducting coating substance 42 connected to sphere 60 as the other plate becomes positive or negative depends on the connection of power supply 74. Versatility can be achieved by using three-position switches or relays for switching at 76 and 77 of FIG. 7.

After the 2-terminal capacitor 70 has attained a charge, power supply 74 can be disconnected from the capacitor 70 by means of breaking the charging path via switch 76 or 77 or both. The connection from power supply 74 to conductors 42 should be broken to safeguard power supply 74.

The plate formed by ionized gas 40 in each tube can now be removed by disconnecting power supply 66 via switches 80 or 81 or both. When using a filament-type tube 34B as in FIG. 6, it is advisable to disconnect the filament-heating power supplies via starter switches 57 or both.

When fast action is required in the changing to state from 2- or 1-terminal capacitor operation, the gas 40 can have quenching type additives as known in the art. The charge on the other plate (sphere 60 connected to conductors 42) remains. If capacitor 70 (2-terminal capacitor array) had a capacity of 10 microfarads (which can be attained by using a sufficient number of the tubes 34–42) and was charged up to 10,000 volts, the charge would be 1/10 Coulom (Q equals CV). If the capacity of the sphere 60 was, for example 100 pF (picofarads), the potential which is generated is momentarily about 100 million volts.

It is thus seen that the invention furnishes solutions to various problems as mentioned above, and at reasonable cost of equipment and power supply.

Although the invention has been described in specific terms, it will be apparent to those skilled in the art that there are many modifications, changes and improvements which may be made therein without departing from the spirit and scope of the invention as herein claimed. Further, if desired, the switching arrangements at 76, 77, 80 and 81 of FIG. 7 may be mounted inside the sphere 60, if convenient.

What is claimed is:

1. A capacity changer device comprising first capacitor means, second capacitor means, first power supply means and second power supply means, first means including normally open switch means for selectively connecting said first power supply means to said first capacitor means, and second means for selectively connecting said second power supply means to said second capacitor means, said first capacitor means including at least one evacuated air-free glass tube having an ionizable gas disposed therewithin, a pair of spaced electrodes disposed within said glass tube and having a corresponding electrode terminal extending outwardly through said glass, of said tube to the outside thereof, and said first connection means being operable to connect said first power supply means to said electrode terminals through said switch means.

2. A capacity changer device in accordance with claim 1, wherein each of said first capacitor means comprises an external terminal plate of conductive material carried on the outside of said glass tube and insulated from said spaced electrodes of said glass tube, and the outer surface of said glass tube including said external terminal plate forming a first 1-terminal capacitor.

3. A capacity changer device in accordance with claim 2, wherein said first power supply means comprises a source of alternating or direct current for energizing said spaced electrodes in said tube for ionization of said gas within said tube.

4. A capacity changer device in accordance with claim 3, wherein said first and second capacitor means forms a 2-terminal capacitor, and said second power supply means comprises a source of direct current which is operable to charge said 2-terminal capacitor.

5. A capacity changer device in accordance with claim 4, including a hollow metal sphere for enclosing said glass tubes forming a second 1-terminal capacitor, and said metal sphere being spaced from said glass tubes.

6. A capacity changer device in accordance with claim 5, wherein said first 1-terminal capacitor comprises a plurality of said glass tubes having said internal spaced electrodes and said external terminal plate for each of said glass tubes, and first circuit means for connecting all of said external terminal plates together, and second circuit means for connecting all of said external terminal plates to said hollow metal sphere to form a 2-terminal capacitor.

7. A capacity changer device in accordance with claim 6, comprising means for connecting a first terminal of said second power supply means to each of said external terminal plates of said glass tubes, and means for connecting said external terminal plates to said metal sphere, and means for connecting a second terminal of said second power supply means to said electrodes terminals at one end of said glass tubes for charging said thus formed 2-terminal capacitor and for changing the state of the device from 1-terminal capacitor to a 2-terminal capacitor.

8. A capacity changer device in accordance with claim 7, wherein said internal spaced electrodes are heated filaments.

9. A capacity changer device in accordance with claim 7, wherein said internal spaced electrodes are unheated electrodes.

* * * * *